US008018946B2

(12) United States Patent
Chang et al.

(10) Patent No.: US 8,018,946 B2
(45) Date of Patent: Sep. 13, 2011

(54) APPLICATION MESSAGING SYSTEM WITH FLEXIBLE MESSAGE HEADER STRUCTURE (75) Inventors: Shean-Guang Chang, Morris Plains, NJ (US); John R. Wells, Scotch Plains, NJ (US); Stephen Felts, Denville, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 1610 days.

(21) Appl. No.: 11/187,117

(22) Filed: Jul. 22, 2005

(65) Prior Publication Data
US 2005/0254493 A1 Nov. 17, 2005

Related U.S. Application Data (63) Continuation of application No. 09/918,350, filed on Jul. 30, 2001, now Pat. No. 7,185,105.

(60) Provisional application No. 60/290,197, filed on May 11, 2001.

(51) Int. Cl.
*H04L 12/28* (2006.01)
(52) U.S. Cl. .................................. 370/394; 370/389
(58) Field of Classification Search .............. 370/394, 370/389
See application file for complete search history.

(56) References Cited

U.S. PATENT DOCUMENTS

| | | | |
|---|---|---|---|
| 5,023,907 A | 6/1991 | Johnson et al. | |
| 5,265,250 A | 11/1993 | Andrade et al. | 395/650 |
| 5,313,589 A | 5/1994 | Donaldson et al. | |
| 5,671,279 A | 9/1997 | Elgamal | |
| 5,671,285 A | 9/1997 | Newman | |
| 5,673,315 A | 9/1997 | Wolf | |
| 5,758,068 A | 5/1998 | Brandt et al. | |
| 5,790,664 A | 8/1998 | Coley et al. | |
| 5,794,039 A | 8/1998 | Guck | |
| 5,940,504 A | 8/1999 | Griswold | |
| 6,009,173 A | 12/1999 | Sumner | |
| 6,014,688 A | 1/2000 | Venkatraman et al. | |
| 6,029,145 A | 2/2000 | Barritz et al. | |
| 6,055,413 A | 4/2000 | Morse et al. | |
| 6,273,535 B1 * | 8/2001 | Inoue et al. | 347/3 |
| 6,446,136 B1 | 9/2002 | Pohlmann et al. | |

(Continued)

OTHER PUBLICATIONS

Description of BEA Tuxedo Release 7.1, retrieved from the Internet [URL: http://edocs.bea.com/tuxedo/tux71/html/dvlibra7.htm] on Aug. 23, 2007, pp. 1-5.

(Continued)

*Primary Examiner* — Daniel J Ryman
*Assistant Examiner* — Jay P Patel
(74) *Attorney, Agent, or Firm* — Fliesler Meyer LLP (57) ABSTRACT

The Flexible Message Header (FMH) is a typed modular message structure comprising one or more Typed Container Modules (TCM)—stateful message modules with a compact header (Typed Container Header, TCH), a user definable payload (Typed Container Body, TCB), and a set of payload-specific callback to handle the lifecycle of the module at the different state such as creation, preparation, manipulation, resizing, transferring, and deletion. A single message comprises a small header with various numbers of TCMs. The integrity of the entire message is not affected by dynamically modifying, adding or removing TCM from the message. Major message content change can be achieved by either adding a TCM or swapping the TCM with different TCM. Minor message content change can be achieved by either modifying or expanding the TCM directly within the message. New features can be supported by adding new TCM and new code to process the new TCM.

15 Claims, 3 Drawing Sheets

U.S. PATENT DOCUMENTS

| | | |
|---|---|---|
| 6,609,128 B1 | 8/2003 | Underwood |
| 6,640,244 B1 | 10/2003 | Bowman-Amuah |
| 6,691,175 B1 | 2/2004 | Lodrige et al. |
| 6,760,752 B1 | 7/2004 | Liu et al. |
| 6,766,305 B1 | 7/2004 | Fucarile et al. |
| 6,772,216 B1 * | 8/2004 | Ankireddipally et al. .... 709/230 |
| 6,880,016 B1 * | 4/2005 | Van Der Heijden et al. . 709/230 |
| 6,901,052 B2 * | 5/2005 | Buskirk et al. ................ 370/235 |
| 6,917,976 B1 | 7/2005 | Slaughter et al. |
| 7,143,093 B1 | 11/2006 | Bracho et al. |
| 7,234,103 B1 | 6/2007 | Regan |
| 7,298,840 B2 * | 11/2007 | Gehrmann et al. ............. 380/36 |
| 7,411,968 B2 * | 8/2008 | Chong et al. ................. 370/412 |
| 2002/0065780 A1 | 5/2002 | Barritz et al. |

OTHER PUBLICATIONS

Cohen, et al., "General Event Notification Architecture Base: Client to Arbiter", http://www.upnp.org/download/draft-cohen-gena-client-01.txt, Jan. 3, 2007, Internet-Draft, GENA Base, Sep. 6, 2000, pp. 1-14.

"Statement of Position 97.2—Software Revenue Recognition," Journal of Accountancy v185 n1, pp. 106-119, Jan. 1998, ISSN: 0021-8448.

* cited by examiner

APPLICATION MESSAGING SYSTEM WITH FLEXIBLE MESSAGE HEADER STRUCTURE

CLAIM OF PRIORITY

This application is a continuation of U.S. Patent Application "APPLICATION MESSAGING SYSTEM WITH FLEXIBLE MESSAGE HEADER STRUCTURE", application Ser. No. 09/918,350, filed Jul. 30, 2001, now U.S. Pat. No. 7,185,105, which claims the benefit of U.S. Provisional Application "APPLICATION MESSAGING SYSTEM WITH FLEXIBLE MESSAGE HEADER STRUCTURE", Application No. 60/290,197, filed May 11, 2001, each of which applications is incorporated herein by reference.

This application is related to U.S. Pat. No. 5,265,250, filed Mar. 29, 1990, and issued Nov. 23, 1993, which is also incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to messaging systems for use with distributed application servers, and particularly to a flexible message header structure for communicating messages.

BACKGROUND OF THE INVENTION

In a distributed application system, such as those provided by the Tuxedo system developed by BEA Systems, Inc., San Jose, Calif., most of the distributed applications use tightly coupled messages to communicate. Adding or modifying message-related application features almost always requires changing the message format, which has an impact on the rest of the software code that is exposed to the message. The change in message compatibility is an important issue in a multi-release environment.

BEA Tuxedo is just one example of such a messaging system. Earlier versions of the product have a fixed message format to support all of the existing features at the time. The message format is exposed to almost the entire Tuxedo code base. In the past small changes to the message format were made by using a few reserved fields in the message. Major additions to the messaging format were simply not allowed. One resultant problem with this approach is that a single fixed size message format makes use of the system resources and the network bandwidth in a less than efficient way.

The future growth of application server products such as Tuxedo requires an improved messaging system that is flexible enough to facilitate adding major new features with little or no impact to the existing code base. The messaging system should be efficient enough to reduce the message footprint for any features depending on it, without rewriting the code, and to be flexible enough to allow multi-release deployment without patching the older releases. Particularly, a solution to the problem as it affects Tuxedo requires a new message header in order to carry a longer Tuxedo service name and to reduce overhead both on the queues, and over the network. In addition, future projects related to application servers including Tuxedo, require a more flexible format than the existing message header so that different types of data can be carried as part of the header without implying any dependency between the different types of data in order to access, manage or identify each data type. Finally, overall throughput is an important design criteria that should be balanced against the functionality of the messaging system.

SUMMARY OF THE INVENTION

The Flexible Message Header (FMH) of the invention is a new typed modular message structure designed to be compact for efficiency, versatile for plug-and-play complex data type, simple for easy access, and clean for interoperability.

The Typed Container Module (hereinafter referred to as the TCM) is a stateful message module with a compact header (Typed Container Header, hereinafter referred to as the TCH), a user definable payload (Typed Container Body, hereinafter referred to as the TCB) and a set of payload-specific callback to handle the lifecycle of the message module at the different state such as creation, preparation, manipulation, resizing, transferring, and deletion. All of the implementation of the TCM is total hidden behind a set of abstract interfaces such that changing the implementation of the TCM has no impact on the code that is using it.

In accordance with the invention, a single message has a small generic header with various numbers of TCMs. The relationship between TCM and message is clearly defined such that the integrity of the entire message is not affected by dynamically modifying, adding or removing a TCM from the message. This facilitates the handling of the message content with great flexibility and efficiency at one end, and provides a very simple and efficient way to add new features at the other end. Major message content change can be achieved simply by either adding a TCM, or swapping the TCM with a different TCM. Minor message content change can be achieved simply by either modifying or expanding the TCM directly within the message. New features can be added simply by adding new TCM and new code to process the new TCM.

The TCM solution provides several advantages such as the following:

New features can be added by adding new code and new TCM without changing the existing code.

The invention facilitates message content change with flexibility and efficiency. Old and new releases of an application server that uses messaging can be mixed in a single deployment without patching the old release.

Reduction in message footprint by allowing each message to tailor its format to its exact need, instead of having a large common message format for all-purpose use.

Increased performance for forwarding messages by allowing the system to examine each message piece by piece.

Messages can be dynamically accessed at the TCM level directly. This provides flexibility and efficiency to the code that needs to access the message. By accessing message at the TCM level the system allows the TCM to be prepared for local access (e.g. decoding, decrypting, and expansion) at different levels and at different places by design, thereby enhancing performance and transparency.

Commonly used or mandatory TCM can be prepared at a very low level in the system so that the upper level does not need to deal with it. Special or rare TCM can be passed up to the upper level without preparation, which can then decide which step to take on the TCM.

For processes that are forwarding the message, the ability to access messages at the TCM level provides transparency by allowing the system to examine required TCM only, and without being affected by a message having new TCM that is irrelevant to the process.

In a multi-release environment a message using TCM can pass through an older release which may not know all the TCMs in the message, and it can forward the message along to its final destination which has the proper code to process the message. This is very useful in a very large or stable deployment by allowing incremental upgrade within a release or selectively upgrading only part of a release.

DETAILED DESCRIPTION

The Flexible Message Header (FMH) is a typed modular structure that supports a series of Typed Container Modules (TCM). Each TCM is a stateful message module with a compact header (Typed Container Header, TCH), a user definable payload (Typed Container Body, TCB), and a set of payload-specific callback to handle the lifecycle of the module at the different state such as creation, preparation, manipulation, resizing, transferring, and deletion.

In accordance with one embodiment of the invention, a single message has a small generic header, with various numbers of TCMs. The relationship between TCM and message is clearly defined such that the integrity of the entire message is not affected by dynamically modifying, adding or removing TCM from the message at design. This can facilitate and minimize the overhead of handling the message content with great flexibility and efficiency at one end and provide a very simple and efficient way to add new features at the other end.

Major message content change can be achieved simply by either adding a TCM or by swapping the TCM with a different TCM. Minor message content change can be achieved simply by either modifying or expanding the TCM directly within the message. New features can be added simply by adding a new TCM and new code to process the new TCM. Messages can be dynamically accessed at the TCM level directly. This provides a flexibility and efficiency to the code that needs to access the message. By accessing message at the TCM level the system allows TCM to be prepared for local access (e.g. decoding, decrypting, and expansion) at different levels, and at different places thereby enhancing performance and transparency.

The actual (detailed bit by bit) content of the message header itself is not necessary for understanding the invention, although to show how servers such as Tuxedo can benefit from this design, a simple demo relating to Tuxedo is given to show the advantage of the design.

It will be evident to one skilled in the art that, while Tuxedo is referred to herein for purposes of illustration, the invention is not limited to this one particular brand of application server but maybe used with any messaging system or application server that uses messaging and should be afforded the broadest scope.

DEFINITIONS AND ACRONYMS

Flexible Message Header (FMH)—A modular message structure consisting of a Flexible Message Header and multiple TCMs.

STORAGE Mode—One of the data representations of the FMH. This mode is suitable for queuing or sending over the network.

EDIT Mode—One of the data representations of the FMH. This mode is suitable for accessing or editing.

Typed Container Module (TCM)—The modular unit of the Flexible Message Header.

Typed Container Header (TCH)—The header of the Typed Container Module.

Typed Container Body (TCB)—The Body of the Typed Container Module.

TCM Table—A global table having all the known TCM types and their associated typed buffer type and subtype. A portion of the table can be compiled in, and other portions can be added by the API if TCM registration is allowed.

TCM Pointer Set—A pointer pair that is part of the FMH and also is a prefix to the TCM when the FMH is in the EDIT mode.

To take the example of Tuxedo the existing Tuxedo Message Header is a 360 byte fixed format data structure which is not adaptive to the needs of the future Tuxedo releases. In addition, there are fields which are out-dated or fields which need to be re-structured to obtain better performance or support new features. In order to accomplish the above tasks and extend the usefulness of the Tuxedo Message, a new generation of the Tuxedo Message Header designed in accordance with the invention can address these issues.

FMH Modulation

The FMH is a modular-based message header design with typed buffer function support and unique identification. By modularizing the Flexible Message Header into functionally related groups, it can facilitate protocol interoperability, multi-platform support, functional plug-in and direct data manipulation at the module level.

Each module has a type to associate it with its functionality and a specific typed buffer entry to manage the module content at various phases of the message lifecycle. Each module type has a unique TCM table entry which has an index into the typed buffer table to assist with data creation, preparation, flattening and platform conversion.

Module swapping allows messages to flow between different versions of the application server (for example) Tuxedo implementation. By converting data from one module type to another messages can be transferred between different releases of Tuxedo implementations. Also, by encapsulating data inside, a typed module allows data to be examined only at the module level. This means that new data in the new module can be transparent to the old Tuxedo implementation. This feature can be used to allow messages to carry data to be received by multiple recipients who have different levels of knowledge of the message content.

New modules can be introduced without affecting the rest of the message header. Similarly, existing module can be removed. Modules can also be manipulated, such as by decoding or decrypting, independently from the rest of the message content.

Modulation can reduce the footprint of the message header by partitioning the message header into functional modules and only transferring those modules which are needed by the recipient. Modulation with a unique identification for each module can support messages with multiple TCMs having the same type at the same time, or during the entire message lifecycle. Assigning a unique identification for each module. This allows inter-module correlation.

Typed Container Module (TCM)

The basic unit of the Flexible Message Header comprises a header part called a Typed Container Header (TCH) and a body part called Typed Container Body (TCB). When the FMH is in EDIT mode, each TCM, except the one containing the user data, is prefixed with a TCM Attachment Unit which comprises two pointers,—one to point to the next TCM and the other to point to the previous TCM in the message, together with a variable to record the allocated size of the TCM. The TCM containing the user data (the User TCM) does not have the TCM Attachment Unit and is instead directly attached to the FMH. When the FMH converts back into the STORAGE mode from the EDIT mode, the TCM Attachment Unit is removed from the TCMs. Listing 1 shows an example of a TCM structure in accordance with an embodiment of the invention.

```
typedef sruct __tmtcm__t TCM;
struct __tmtcm__t {
unsigned short tmtcm__type;
unsigned short tmtcm__id;
TM32U tmtcm__len;
TM32U tmtcm__flag;
TM32I tmtcm__udata; /* the beginning of the TCB */
}
typedef struct __tmtcmtbl__t TMTCMTBL
struct tmtcmtbl__t {
    int count;
    int tcmhash [TCM__MODULE + 1];
};
typedef struct tmtcm__ele__t TMTCMELE;
static struct __tmtcm__ele__t {
unsigned short tmtcm__type;
char tbtype [TMTYPELEN];
char tbstype [TMSTYPELEN];
TM32I flag; /* 0, reserved for future use */
int next__ele; /* next TCM element in the free or TCM hash table
*/
}
```

Typed Container Header (TCH)

The header part of the TCM comprises a type field, ID field, length field, and a flag field with Header Extension Bits (HEB), wherein these variables are defined as follows:

Type field—An index into a global TCM table.

ID field—A unique identification number during the message lifecycle.

Length field—The size of the TCH plus the size of the used data space in the TCB. The actual size of the allocated space for the TCM can be larger than the length field.

Flag field—The flags currently used are:
 TCM_IN_USED—The TCM is in use.
 TCB_ENCODE—The TCB is in "encoded" state.
 TCM_UNKNOWN—The TCM is in an unknown state.
 TCM_TTL—A flag indicating the TCM's time-to-live.

Header Extension Bits—The lower four bits of the flag field. The Header Extension Bits (HEB) are used to extend the TCH by increments of four bytes. 32 bit unsigned variables (which in the code examples referred to as TM32U variables; 32 bit signed integers are referred to as TM32I variables) are used so that the TCH can be decoded/encoded without the knowledge of its content. If the HEB is not zero then the lower four bits of the last four bytes in the extended TCH has to be the same as the HEB. This allows traversing from the TCB back to the TCH.

The TCM_TTL flag indicates the TCM's time-to-live. TTL flag is particularly useful when a message from a first process or application to a second process or application passes through, or is routed by, an intermediate process. The intermediate process likely does not care about the content of the message itself, but may care about whether it should or should not store the message, or any portion of the message, in its memory space. The invention allows individual TCM's to have different TTL values. Intermediate processes can use this TTL flag as an indicator of whether or not that particular TCM has changed since it was last sent. If the TTL flag indicates the TCM has not changed (for example setting the TTL flag to zero), then the memory allocated to this particular TCM can be freed for other uses.

Typed Container Body (TCB)

This is the data portion of the TCM, and can be any binary data format. A typed buffer switch via the TCM type is used to administrate the TCB during the message lifecycle. Accessing the TCB is done in two steps—the first step is an API call to locate the TCM containing the TCB; the second step allows direct accessing or editing of the TCB content.

Flexible Message Header (FMH)

The Flexible Message Header in accordance with the invention comprises a message header and one or more TCMs. In one embodiment the FMH has two modes; STORAGE mode and EDIT mode.

In STORAGE mode, the FMH is suitable for queuing messages or shipping them on the network. In STORAGE mode, the message is stored in one continuous memory space and all of the TCMs are stored without their TCM pointer set.

In EDIT mode, the FMH is suitable for accessing or editing. In EDIT mode, the message may be scattered over several memory spaces. The Flexible Message Header and the User TCM can be contained in one continuous memory space, and the rest of TCMs with their TCM pointer set contained in one or more other continuous memory spaces. Listing 2 shows an example of a Flexible Message Header structure.

```
typedef struct __tmFMH__t FMH
struct __tmFMH__t {
char *tcmp__f;              /* point to the tcmp__f of the next TCM */
char *tcmp__p;              /* always to be NULL */
TM32I bsize;                /* memory size of the allocated space */
METAHDR mhdr;               /* the Tuxedo meta header */
TM32I magic;                /* magic number for the
                               memory space allocation
*/
unsigned short tmfmh__flag;
unsigned short  tmfmh__maxid;       /* the maximum id in the
message */
}
```

The FMH comprises a TCM attachment unit, a meta header, a flag field, and a maximum ID field, wherein these fields are defined as follows:

TCM Attachment Unit—The TCM Attachment Unit includes two pointers to both the next and the previous TCMs respectively. It is used only when the message is in the EDIT mode, and also includes a size variable to indicate the allocated memory space of the FMH. The TCM Attachment Unit is not sent as part of the sent message.

Meta header—A 32 byte field included as part of the Message Header, and particularly the Tuxedo Message Header when the application server is Tuxedo.

Magic—a magic number included as part of the Tuxedo Message Header when the application server is Tuxedo.

Flag (unsigned short)—Indicates the status of the FMH. The flags currently used are:
  FMH_IN_USED—The message is in use.
  FMH_EDIT—The message is in EDIT mode.
  FMH_STORAGE—The message is in STORAGE mode.
Maximum id (unsigned short)—the maximum id field denotes the largest identifier ever assigned to any TCM within the message. It increments by one every time a new TCM is added to the message. In one embodiment the maximum number for this field is 65535. It is used to assure a unique id is associated to each TCM within the message.

Figure 1:
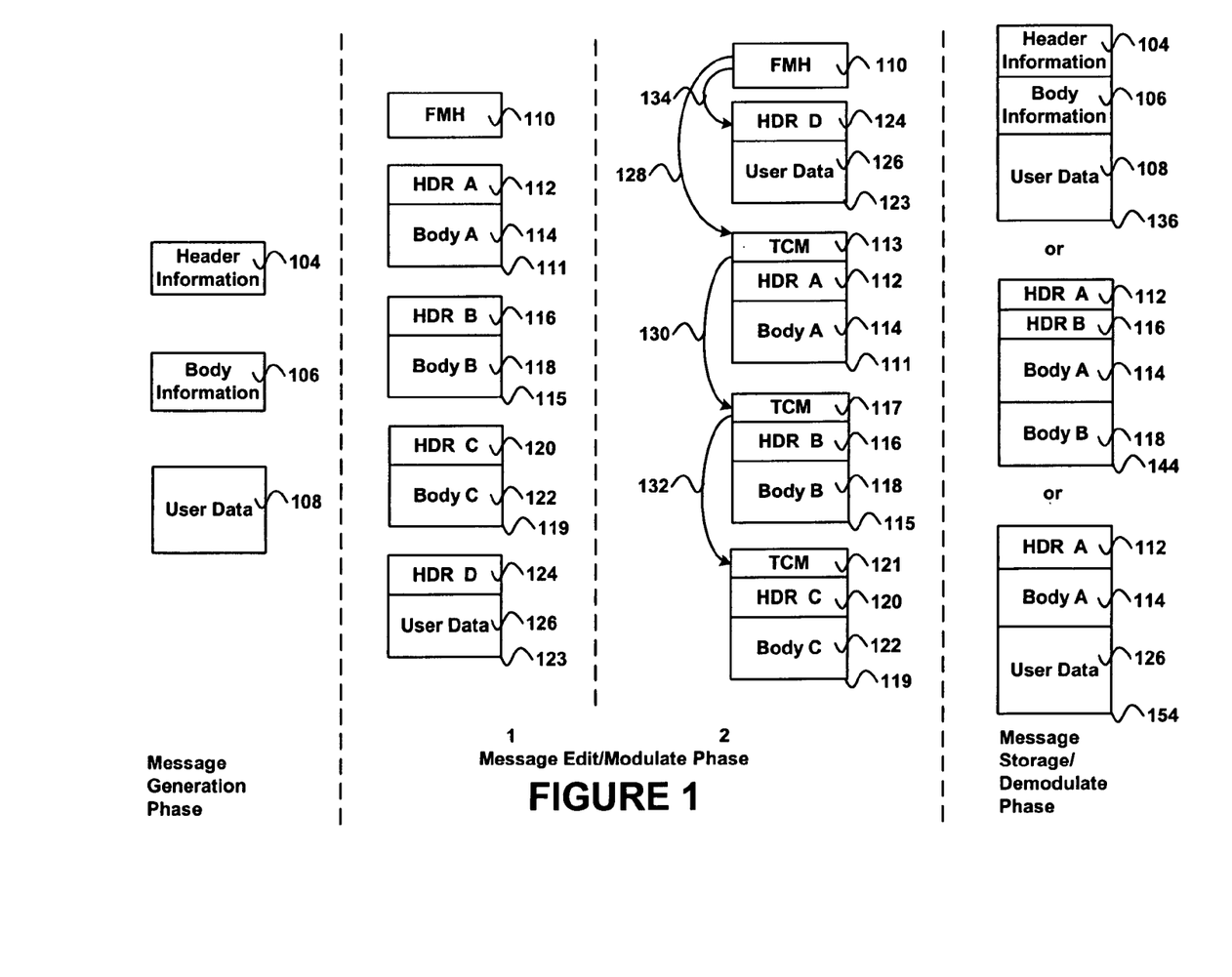
FIG. 1 shows the transfer of a message using a Flexible Message Header structure in accordance with an embodiment of the invention.

FIG. 1 illustrates the various phases in which an original message can be generated, modulated, and stored at a recipient's location. As shown in FIG. 1, the message may pass through a number of phases in its transmission from one application to another. At a first application, a message 102 is initially created comprising a header information portion 104, a body information portion 106, and a user data portion 108. During an editing/modulating phase a Flexible Message Header (FMH) 110 is created, together with a number of Typed Container Modules (TCM) 111, 115, 119, 123, each of which has a Typed Container Header (TCH) portion 112, 116, 120, 124 and one of either a Typed Container Body (TCB) portion 114, 118, 122, or a user data portion 126. The TCM's contain the full content of the original header information, body information and user data, divided between a number of TCM's. An Attachment Unit 113, 117, 121 is added to each TCM that contains TCB information (in this example 111, 115, 119). The Attachment Unit provides pointers to both the FMH (indicated by the arrow 128), and to the previous and successive TCM's in the chain (indicated by arrows 130, 132). A TCM containing no TCB information and instead only user data (for example TCM 123) is not prefixed with an Attachment Unit and is instead directly linked to the FMH via an independent pointer (indicated by the arrow 134). When the message is received at the final destination and stored, the second (receiving) application retrieves only those TCM's for which it is configured to received. Other TCM's may be ignored. So, for example, the second application may choose to receive the entire message as originally sent, including the full header 104, body 106, and user data 108; or it may choose to receive only header portion A 111, Header portion B, 115, Body portion A 114, Body portion B, 118; or it may choose to receive only header portion A 111, Body portion A 114, and user data 126. Owing to the flexibility of the Flexible Message Header system, the application receiving the message can be configured to only listen for, receive and use a portion of the transmitted message. This allows for less network traffic at the receiving end, and greater flexibility in modifying the messaging format at a later point in time, for example, for a new release of the application server, without having to re-write existing application code.

Figure 2:
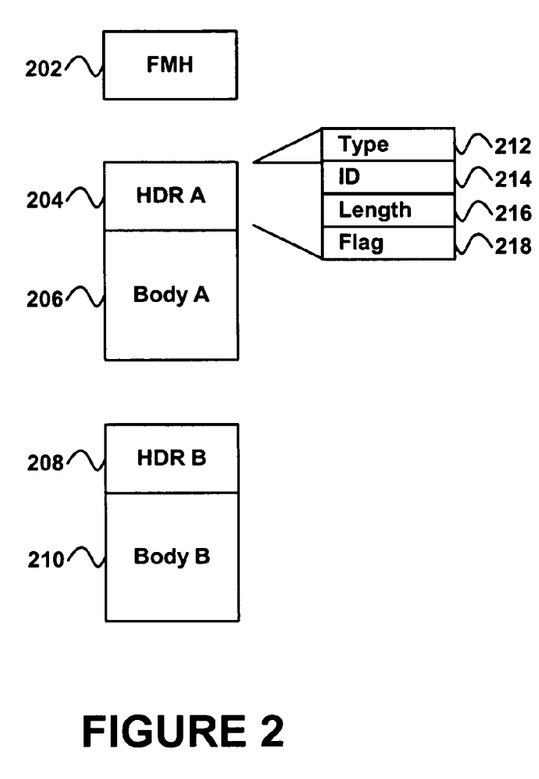
FIG. 2 shows a detailed view of an embodiment of the Flexible Message Header structure of FIG. 1.

FIG. 2 illustrates a detailed view of a non-user data TCM module during the edit/modulation phase. Each TCM module (not including the user data modules) includes a TCH header portion 204, and a TCB body portion 206. The header portion 204 comprises a number of fields that are used to describe or type that particular module, and to distinguish that module from others in the same message. These fields may include, in one embodiment, a Type field 212 which can be an index into a global TCM table to denote the type of TCM; an ID field 214 for uniquely identifying the TCM during the message lifecycle; a length field 216 to denote the size of the TCH plus the size of the used data space in the TCB; and a flag field 218, wherein the flags may be any of (for example): TCM_I-N_USED—the TCM is in use; TCB_ENCODE—the TCB is in "encoded" state; TCM_UNKNOWN—the TCM is in an unknown state.

Figure 3:
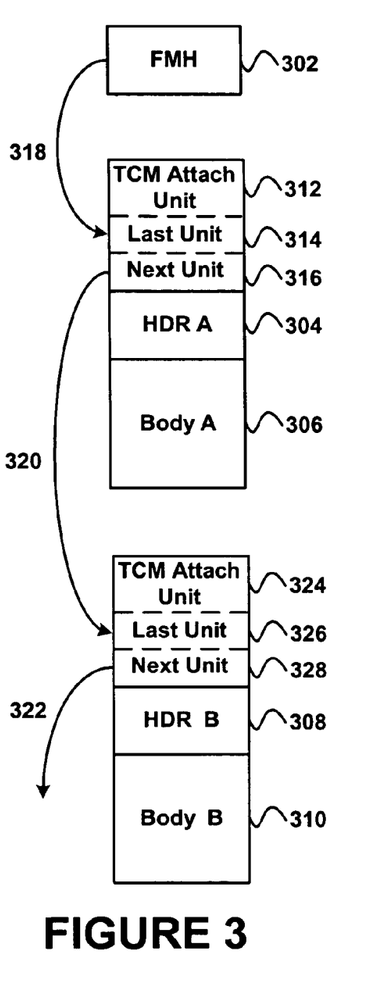
FIG. 3 shows a detailed view of the pointer linking of FIG. 1.

FIG. 3 shows how TCM's are linked to one another and to the FMH during the edit/modulation phase. A TCM Attachment Unit is prefixed to each TCM, other than those TCM's carrying only user data. User data TCM's are linked directly to the FMH as shown in FIG. 1, and are not shown here for reasons of clarity. TCM's which contain a TCH and a TCB are linked through their Attachment Units, which contain pointers to the preceding TCM (or the FMH) and to the succeeding TCM. In the example given in FIG. 3, a first TCM 304 is prefixed with a TCM Attachment Unit 312, which in turn contains a Last Unit pointer 314 to the FMH (indicated by the arrow 318), and a Next Unit pointer 316 to the succeeding (second) TCM 308 (indicated by the arrow 320). The second TCM 308 is prefixed with a TCM Attachment Unit 324, which in turn contains a Last Unit pointer 326 to the FMH (indicated by the arrow 320), and a Next Unit pointer 328 to the next TCM (indicated by the arrow 322). The process continues for all TCM's comprising this particular message.

Figure 4:
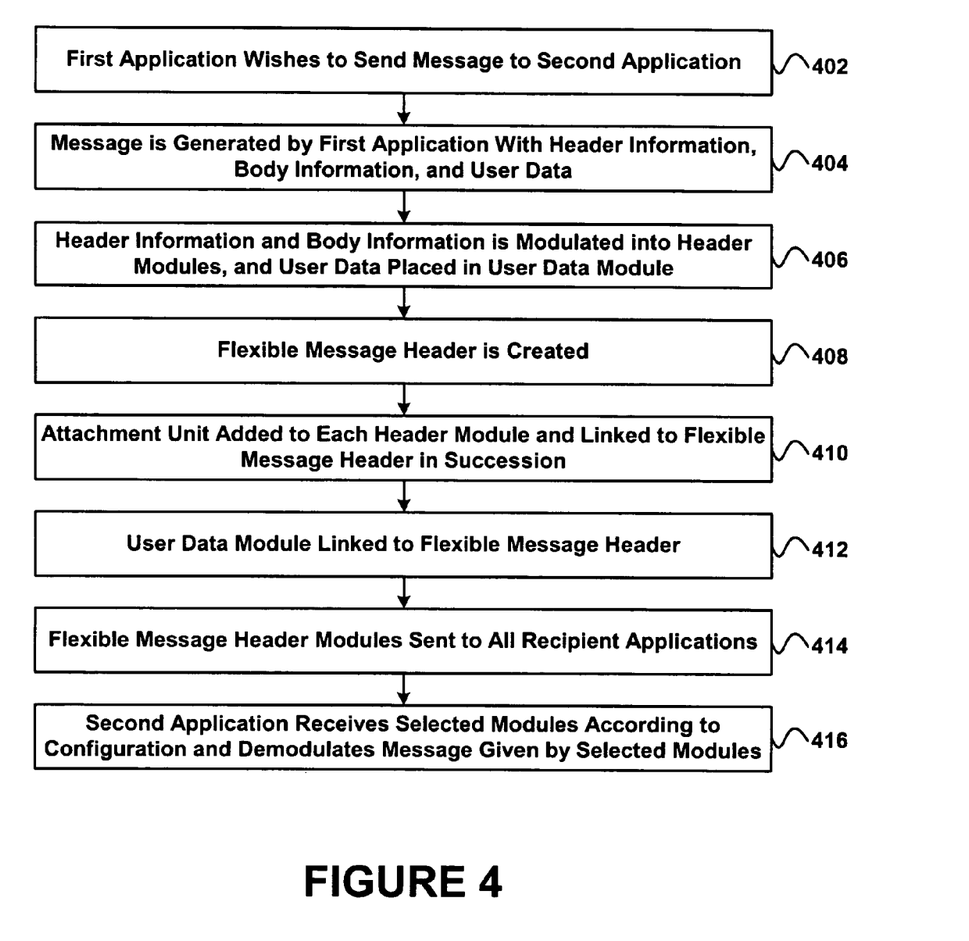
FIG. 4 is a flowchart of a messaging process in accordance with an embodiment of the invention.

The method used by an embodiment of the invention in messaging between applications is shown in FIG. 4. In step 402 a first application wishes to send a message to a second application. In step 404, a message is generated by the first application, together with header information, body information, and user data. In step 406, the header information and body information is segmented or modulated into header modules, and the user data is placed in a user data module. The Flexible Message Header is then created (step 408), and in step 410 an attachment unit added to each container module so that the container modules can be linked to the Flexible Message Header and to each subsequent container module in succession. The user data module is independently linked to the Flexible Message Header (step 412). Modulated as such the message can be sent as a series of typed container modules to the recipient applications (step 414), where in step 416 a second application can receive them, and selecting among certain of the container modules, reconstruct and store the message according to its particular configuration needs.

Function Interfaces (API's)

The following section details various FMH-related functions that may be used by a developer in accordance with the invention to manipulate or access the TCM, TCB, and FMH. The particular functions listed here illustrate one embodiment of the invention. A detailed description of other API functions that can be used with the invention, including those not specifically related to the FMH header structure (such as the_t-minitbuf( ), and_tmreinitbuf( ) functions), are given in the related U.S. Pat. No. 5,265,250, incorporated by reference, which also contains additional detail on the functions described herein as they pertain to non-FMH systems. It will be evident to those skilled in the art that equivalent or alternative function calls can be used to effect similar functionality, and are within the spirit and scope of the invention.

```
#if defined (_STRICT_ANSI)
typedef TCBP void *
#else
typedef TCBP char *
#endif
```

Register TCM Table Entry (_tmfmsg_regtcm)
int _tmfmsg_regtcm(unsigned short tcmtype, char *type, char *subtype, TM32U flag)

This function creates a TCM Table entry with the tcmtype as the unique key and its associated typed buffer type and subtype. When searching the corresponding typed buffer table entry, an Internal Typed Buffer Table is used first, then a User Typed Buffer Table. The search stops at the first match of both the type and the subtype. Upon successful completion, a new TCM Table entry is generated.

Deregister TCM Table Entry (_tmfmsg_dregtcm)
int _tmfmsg_dregtcm(unsigned short tcmtype, TM32U flag)

This function removes an existing TCM Table entry matching the tcmtype. Upon successful completion, the matching entry is removed from the TCM Table.

Locate TCM (_tmfmsg_loctcm)
int _tmfmsg_loctcm(unsigned short tcmtype, TM32U flag)

This function returns the results of the search for the specified tcmtype entry in the TCM table. Upon successful completion, the function indicates that the given tcmtype is existing in the TCM table.

Create TFMM Object (_tmfmsg_create)
FMH * _tmfmsg_create(char *type, char *subtype, TM32U len, unsigned short *id, TM32U flag)

This function generates a FMH object, and is typically the first function called during a message preparation phase. Upon successful completion, a FMH object is dynamically allocated with a FMH and a user TCM having the TCB size equals to len, and a pointer to the FMH is returned with the pointer*id set to the tmtcm_id of the user TCM. The returned FMH is in the EDIT mode.

In some embodiments the User TCM module is added directly to the FMH to minimize the likelihood of it needing to be relocated in memory at a later point in time. Since the user data can vary considerably both in size and in content, placing it in this location reduces the chances of it having to be moved again. Additional (non user data) TCM's, which are typically more standard and smaller in size than User TCM's can then added on to the FMH. Since the non-user data TCM's are smaller in size, the fact that they may need to be relocated in memory at a later point in time is not as important.

Add TCM Module (_tmfmsg_addtcm(EDIT))
TCBP _tmfmsg_addtcm(FMH *msg, unsigned short type, TM32U len, unsigned short * id, TM32U flag)

This function attaches a TCM module to the FMH. Upon successful completion, either a type TCM with len bytes of TCB is added to the FMH pointed to by the msg and the address of the new TCB is returned, or an existing "unused" TCM which has a TCB larger enough is re-used and the address of the existing TCB returned. The value of the tmtcm_id of the TCM is stored in a pointer *id. The _tminitbuf( ) functions is called to initialize the TCB. The inter-TCM sequence is not preserved.

This function does not apply to the User TCM—as described above, in some embodiments the User TCM module is added directly to the FMH to minimize the likelihood of it being relocated in memory at a later point in time.

Count TCM (_tmfmsg_counttcm (EDIT))
int _tmfmsg_counttcm(FMH *msg, unsigned short type, TM32U flag)

This function retrieves the number of TCMs having type. Upon successful completion, the total number of TCMs having type is returned. This function does not apply to the User TCM.

Find TCM (_tmfmsg_findtcm (EDIT))
TCBP _tmfmsg_findtcm(FMH *msg, unsigned short type, unsigned short *id, TM32U flag)

This function searches the TCM having the required type and the unique identification. Upon successful completion, the TCB address of either the TCM having type and also the identification or the first TCM having type if id is found to be NULL is returned. This function does not apply to the User TCM. The TCB is automatically decoded if needed and a postrecv function called if needed.

Find User TCM (_tmfmsg_findutcm (EDIT))
TCBP _tmfmsg_findutcm(FMH *msg, char *type, char *subtype, TM32U flag)

This function searches the User TCM. Upon successful completion, the TCB address of the User TCM is returned. This function only applies to the User TCM. The TCB is automatically decoded if needed and postrecv called if needed.

Resize User TCM (_tmfmsg_rszutcm(EDIT))
TCBP _tmfmsg_rszutcm(_TCADEF,FMH **msg, char *type, char *subtype, TM32U len, TM32U flag)

This function changes the size of the TCB portion of the User TCM. Upon successful completion, the size of the TCB is changed to len bytes and the address of the re-sized TCB returned. The flag can be used for: TCM_NO_RESIZE—just to mark the new size and not do the reallocation when the new size is smaller than the old one; and TCM_RESET—to reset the old TCB when copying to a new TCM or reset part of the TCB when reducing the TCB size.

Resize TCM (_tmfmsg_rsztcm(EDIT))
TCBP _tmfmsg_rsztcm(_TCADEF,FMH *msg, TCBP tcbp, TM32U len, TM32U flag)

This function changes the size of the TCB portion of the TCM. Upon successful completion, the size of the TCB is changed to len bytes and the address of the re-sized TCB returned. The flag can be used for: TCM_NO_RESIZE—just to mark the new size and not do the reallocation when the new size is smaller than the old one; and TCM_RESET—to reset the old TCB when copying to a new TCM or reset part of the TCB when reducing the TCB size. This function does not apply to the User TCM.

Delete TCM (_tmfmsg_deltcm(EDIT))
int _tmfmsg_deltcm(FMH *msg, TCBP tcbp, TM32U flag)

This function invalidates a TCM from the FMH. Upon successful completion, the TCM is deleted or marked as free from the FMH object. The flag can be used for: TCM_NO_T_USED—just to mark the TCM being "not used" but do not free it; and TCM_RESET—to initialize the TCB to zero. This function does not apply to the User TCM.

Decode TCM (_tmfmsg_dectcm(EDIT))
TCBP _tmfmsg_decutcm(FMH *msg, TCBP tcbp, TM32U flag)

This function decodes a TCM. Upon successful completion, the address of the decoded TCB is returned. This function does not apply to the User TCM. The function _tmdecdec( ) is called if needed.

Decode User TCM (_tmfmsg_decutcm(EDIT))
TCBP _tmfmsg_dectcm(FMH **msg, char *type, char *subtype, TM32U flag)

This function decodes the User TCM. Upon successful completion, the address of the decoded TCB is returned. This function only applies to the User TCM. The function _tmdecdec( ) is called if needed.

Presend (Edit) (_tmfmsg_presend(EDIT))
FMH * _tmfmsg_presend(FMH *msg, char *type, char *subtype, TM32U flag)

This function converts the FMH from the EDIT mode into the STORAGE mode. Upon successful completion, either the msg is returned or the address of a new FMH object is returned. The flag can be used for: ENCODE_TCM—encode all the TCMs (TCHs and TCBs). When the TCM is either encoded or unknown then the function _tmpresend( ) is not called.
Postsend (Edit, Storage) (_tmfmsg_postsend(EDIT, STORAGE))
FMH *_tmfmsg_postsend(FMH *msg, char *type, char *subtype, TM32U flag)

This function converts the FMH from the after presend state back to the before presend state. When the TCM is either encoded or unknown, the function _tmpostsend( ) is not called.
Postreceive (Storage) (_tmfmsg_postrecv(STORAGE))
FMH *_tmfmsg_postrecv(FMH *msg, TM32U flag)

This function converts the FMH from the STORAGE mode into the EDIT mode. When the TCM type is unknown it will mark as unknown and the _tmpostrecv( ) function is not called, or if the TCM is encoded then_tmpostrecv( ) is not called. The User TCM is marked as unknown only. The inter-TCM sequence is not preserved.
Free Memory (_tmfmsg_free(EDIT, STORAGE))
int _tmfmsg_free(FMH *msg, char *type, char *subtype, TM32U flag)

This function frees up the memory space of the FMH. Upon successful completion, the FMH object is either marked as not used or freed. The flag can be used for: FMH_NOT_USED—just mark all the TCM as "not used" but do not free it; and FMH_RESET—initializes all the TCBs to zero.
Initialize Buffer (_tmuninitbuf( ))

The _tmuninitbuf( ) function is called for each TCM if it is not unknown, encoded or not in-used.

A detailed description of other API function calls that can be used with the invention, including those not specifically related to the FMH header structure, is given in the related U.S. Pat. No. 5,265,250, incorporated by reference.
Macros Macro functions can be used by the developer to retrieve useful information about the state of the FMH, TCM and TCB, and to assist in the messaging process. The macros shown here are given for purposes of illustration.
GETTCB (tcmp)—This macro will return the address of the TCB from the address of a TCM.
GETTCM (tcbp)—This macro returns the address of the TCM from the address of a TCB.
ISTCBENC (tcmp)—This macro returns 1 if the TCB is encoded. Otherwise, it returns 0.
TCBSIZE (tcmp)—This macro returns the size of the TCB.
TCMID (tcmp)—This macro returns the unique identification of the TCM.
TCMTYPE (tcmp)—This macro returns the type of the TCM.
USERTCM(FMHp)—This macro returns the address of the User TCM from the address of the a FMH object.
FIRSTTCM (FMHp)—This macro returns the address of the first TCM from the address of a FMH object.
NEXTTCM (tcmp)—This macro returns the address of the next TCM from the address of a given TCM.
ISTCMUSED(tcmp)—This macro returns 1 if the TCM is in-used. Otherwise, it returns 0.
Some error codes that may be generated for these functions are listed below:
TUX->_TUX_tpermo(TPEOS).
GP->_GP_Uunixerr(USBRK)—There is no available memory.
TUX->_TUX_tpermo(TPENOENT)—The type and subtype are not in the typed buffer table (TCM Table).
TUX->_TUX_tpermo(TPEMATCH)—The tcmtype is currently used in the TCM table.
TUX->_TUX_tpermo(TPEINVAL)—The flag is not 0 or the tcmtype is part of the internal TCM table entries, or type is the User TCM type, or msg is NULL or has the wrong state, or flag is not 0, or TCB size is 0, or tcbp points to either an User TCM or a not in-used TCM or a TCM in wrong state, or msg is NULL or has the wrong state, or TCB size is 0.
TUX->_TUX_tpermo(TPESYSTEM)—The _tminitbuf( ) failed or _tmencdec( ) failed or _tmpostrecv( ) failed, or tmpresend( ) failed or _tmencdec( ) failed or TCH encode failed, or TCH decode failed or _tmpostrecv( ) failed, or -_tmuninitbuf( ) failed.
Message Flexibility and Integrity The invention allows for great flexibility and compatibility in message handling throughout the release cycle. Since the end process (the receiving application) can be designed or configured to look for, or to read, only a particular portion of the FMH, or a particular subset of TCM's, the FMH can be modified between releases (or between different system architectures) to add extra functionality, while retaining compatibility with older releases (or other system architectures). An older version of the application will simply ignore the TCM's it is not configured to read, or will render the TCM as an "unknown" type. The FMH is similarly capable of providing a message format that is machine independent as well as release-independent.

One of the potential problems with this approach is that an older release of an application or process may unwittingly accept a message that contains header information in a TCM it has rendered as "unknown", but which in fact contains harmful code, for example a computer virus. To counter this, embodiments of the invention are particularly well suited to ensuring the integrity of the messaging process. This is particularly important for security-related and secure applications. In accordance with this embodiment, the messaging system includes a "fail on unknown" mechanism. A receiving application or process can be configured so that, if it receives a TCM it does not recognize, it fails, or rejects the message. A notification of the message failure is then sent to the sending process. This mechanism can be used to assure that the message is delivered with the integrity required by the sender. For example, the sender may specify a message with a format that includes a PKI (Public Key) security TCM. If the recipient is an older release that does not recognize the PKI TCM, then delivering that message would violate the senders requirements—in this case not delivering the message is the safer option.

INDUSTRIAL APPLICABILITY

The methods required for registration resolution of TCM type are independent of the context of this application, and are dependent on the context of who will use the APIs and how to manage the "type" and "subtype" space among the users. The TCM type creation mechanism can, for example, use a simple pre-assigned type space for each user or perhaps a hashing process for some pre-defined type name formats that each user has to follow in order to quarantine an unique type.

The FMH provided by the invention changes the performance landscape in comparison with a fixed format message structure. The balance between the performance gain at the network bandwidth saving and the CPU processing when dealing with a smaller message header and the CPU overhead when dealing with a non-fixed format message structure should minimize any performance penalty imposed on the actual application that uses the messaging system.

The important issue of performance is to choose a design that can provide a flexible and generic framework that can support future growth and that only adds cost at the incremental level with a minimum initial overhead. The FMH is one approach of using the modular concept to achieve that.

The other application servers on the market had no prior solution other than the addition of unused fields which are not a viable long-term solution. The TCM solution offered by the invention has several advantages as following:

New features can be added by adding new code and new TCM without changing the existing code.

Message content change is facilitated with great flexibility and efficiency. Old and new releases can be mixed in a single deployment without patching the old release.

The message footprint is reduced by allowing each message to tailor the FMH to its exact need instead of having a large common message for all-purposes. Performance for forwarding message is increased by allowing a system component such as a server or intermediate recipient to examine a examining message piece by piece.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for messaging between applications in a distributed application system, comprising the steps of:
    generating a first instance of a message at a first application, wherein the message includes a message header information and a body information;
    creating a flexible message header, including placing portions of the message header information and the body information into a plurality of typed container modules including a user typed container module, wherein each typed container module, including the user typed container module, includes a compact header, a user definable payload, and a set of payload callbacks, and wherein the user typed container module further includes user data;
    attaching the user typed container module directly to the flexible message header;
    attaching an attachment unit to each of one or more remaining typed container modules, wherein each attachment unit includes a plurality of pointers, including
        a first pointer linking that typed container module to a previous typed container module in the message, and
        a second pointer linking that typed container module to a next typed container module in the message;
    preparing the flexible message header and the typed container modules for sending, wherein preparing includes storing the flexible message header with the typed container modules;
    sending the flexible message header and the typed container modules to a second, destination application; and
    reconstructing a second instance of the message by the second, destination application, wherein the second, destination application
        retrieves a selection of the one or more remaining typed container modules and the user typed container module, and
        ignores those typed container modules that the second, destination application is not configured to receive.

2. The method of claim 1, wherein all of the typed container modules are sent from the first application to the second application.

3. The method of claim 1, wherein only a portion of the typed container modules are sent from the first application to the second application.

4. The method of claim 1, wherein only a portion of the typed container modules received at the second application are used to reconstruct the second instance of the message.

5. The method of claim 4, wherein each typed contained module has a type associated therewith, and wherein the second application selects some of the typed container modules according to their type.

6. A method for messaging between applications in a distributed application system, comprising the steps of:
    generating a first instance of a message at a first application, wherein the message includes a message header information and a body information;
    creating a flexible message header, including placing portions of the message header information and the body information into a plurality of typed container modules including a user typed container module, wherein each typed container module, including the user typed container module, includes a compact header, a user definable payload, and a set of payload callbacks, and wherein the user typed container module further includes user data;
    attaching the user typed container module directly to the flexible message header;
    attaching an attachment unit to each of one or more remaining typed container modules, wherein each attachment unit includes two pointers, including
        a first pointer linking that typed container module to a previous typed container module in the message, and
        a second pointer linking that typed container module to a next typed container module in the message;
    preparing the flexible message header and the typed container modules for sending, wherein preparing includes storing the flexible message header with the typed container modules;
    sending the flexible message header with the typed container modules to a second, destination application;
    reconstructing a second instance of the message by the second, destination application, wherein the second, destination application
        retrieves a selection of the one or more remaining typed container modules, and
        ignores those typed container modules that the second, destination application is not configured to receive; and
    sending the flexible message header including the typed container modules via an intermediate application, and wherein the intermediate application makes the selection of the one or more remaining typed container modules for forwarding to the second, destination application, and does not forward the non-selected typed container modules.

7. A system for messaging between distributed applications, comprising:
    a computer including a computer readable medium and processor operating thereon;
    a first application, executing on the computer, that generates a first instance of a message, wherein the message includes a message header information and a body information;

a function, executing on the computer, for creating a flexible message header, including
segmenting the message header information and the body information into a plurality of typed container modules including a user typed container module, wherein each typed container module, including the user typed container module, includes a compact header, a user definable payload, and a set of payload callbacks, and wherein the user typed container module further includes user data,
attaching the user typed container module directly to the flexible message header, and
attaching an attachment unit to each of one or more remaining typed container modules, wherein each attachment unit includes two pointers, including
a first pointer linking that typed container module to a previous typed container module in the message, and
a second pointer linking that typed container module to a next typed container module in the message;
a function, executing on the computer, for preparing the flexible message header and the typed container modules for sending, wherein preparing includes storing the flexible message header with the typed container modules;
a function, executing on the computer, for sending the flexible message header and the typed container modules to a second, destination application; and
wherein the second, destination application reconstructs a second instance of the message by
retrieving a selection of the one or more remaining typed container modules and the user typed container module, and
ignoring those typed container modules that the second, destination application is not configured to receive.

8. The system of claim 7, wherein all of the typed container modules are sent from the first application to the second application.

9. The system of claim 7, wherein only a portion of the typed container modules are sent from the first application to the second application.

10. The system of claim 7, wherein all of the typed container modules received at the second application are used to reconstruct the second instance of the message.

11. The system of claim 7, wherein only a portion of the typed container modules received at the second application are used to reconstruct the second instance of the message.

12. The system of claim 11, wherein each typed contained module has a type associated therewith, and wherein the second application selects some of the typed container modules according to their type.

13. A system for messaging between distributed applications, comprising:
a computer including a computer readable medium and processor operating thereon;
a first application, executing on the computer, that generates a first instance of a message, wherein the message includes a message header information and a body information;
a function, executing on the computer, for creating a flexible message header, including
segmenting the message header information and the body information into a plurality of typed container modules including a user typed container module, wherein each typed container module, including the user typed container module, includes a compact header, a user definable payload, and a set of payload callbacks, and wherein the user typed container module further includes user data,
attaching the user typed container module directly to the flexible message header, and
attaching an attachment unit to each of one or more remaining typed container modules, wherein each attachment unit includes two pointers, including
a first pointer linking that typed container module to a previous typed container module in the message, and
a second pointer linking that typed container module to a next typed container module in the message;
a function, executing on the computer, for preparing the flexible message header and the typed container modules for sending, wherein preparing includes storing the flexible message header with the typed container modules;
a function, executing on the computer, for sending the flexible message header and the typed container modules to a second, destination application;
wherein the second, destination application that reconstructs a second instance of the message by
retrieving a selection of the one or more remaining typed container modules and the user typed container module, and
ignoring those typed container modules that the second, destination application is not configured to receive; and
an intermediate application, and wherein the intermediate application makes the selection of the one or more remaining typed container modules for forwarding to the second application, and does not forward the non-selected typed container modules.

14. A non-transitory computer readable medium including instructions stored therein which when executed by a computer causes the computer to perform the steps of:
generating a first instance of a message at a first application, wherein the message includes a message header information and a body information;
creating a flexible message header, including placing portions of the message header information and the body information into a plurality of typed container modules including a user typed container module, wherein each typed container module, including the user typed container module, includes a compact header, a user definable payload, and a set of payload callbacks, and wherein the user typed container module further includes user data;
attaching the user typed container module directly to the flexible message header;
attaching to each of one or more remaining typed container modules an attachment unit, wherein each attachment unit includes two pointers, including
a first pointer linking that typed container module to a previous typed container module in the message, and
a second pointer linking that typed container module to a next typed container module in the message;
preparing the flexible message header and the typed container modules for sending, wherein preparing includes storing the flexible message header with the typed container modules;
sending the flexible message header and the typed container modules to a second, destination application; and
reconstructing a second instance of the message by the second, destination application, wherein the second, destination application retrieves a selection of the one or more remaining typed container modules and the user typed container module, and ignores those typed container modules that the second, destination application is not configured to receive.

15. A non-transitory computer readable medium including instructions stored therein which when executed by a computer causes the computer to perform the steps of:

generating a first instance of a message at a first application, wherein the message includes a message header information and a body information;

creating a flexible message header, including placing portions of the message header information and the body information into a plurality of typed container modules including a user typed container module, wherein the user typed container module further includes user data;

attaching the user typed container module directly to the flexible message header;

attaching to each of one or more remaining typed container modules an attachment unit that includes pointers linking that typed container module to a previous typed container module in the message and to a next typed container module in the message;

preparing the flexible message header and the typed container modules for sending, wherein preparing includes storing the flexible message header with some or all of the plurality of typed container modules and the user typed container module;

sending the flexible message header and the user typed container module and the one or more remaining typed container modules to a second, destination application;

reconstructing a second instance of the message by the second, destination application using the one or more remaining typed container modules; and sending the flexible message header including the user typed container module and the one or more remaining typed container modules via an intermediate application, and wherein the intermediate application selects some of the one or more remaining typed container modules for forwarding to the second, destination application, and does not forward the non-selected typed container modules.

* * * * *

UNITED STATES PATENT AND TRADEMARK OFFICE
CERTIFICATE OF CORRECTION

| | | |
|---|---|---|
| PATENT NO. | : 8,018,946 B2 | Page 1 of 1 |
| APPLICATION NO. | : 11/187117 | |
| DATED | : September 13, 2011 | |
| INVENTOR(S) | : Chang et al. | |

It is certified that error appears in the above-identified patent and that said Letters Patent is hereby corrected as shown below:

In column 5, line 39, below "}" insert -- Listing 1 --.

In column 6, line 52, below "}" insert -- Listing 2 --.

In column 8, lines 64, below "#endif" insert -- Listing 3 --.

In column 10, line 16, delete "(_TCADEF,FMH" and insert -- (_TCADEF, FMH --, therefor.

In column 10, line 27, delete "(_TCADEF,FMH" and insert -- (_TCADEF, FMH --, therefor.

In column 11, line 52, delete "the a" and insert -- a --, therefor.

In column 11, line 61, delete "tpermo" and insert -- tperrno --, therefor.

In column 11, line 64, delete "tpermo" and insert -- tperrno --, therefor.

In column 11, line 66, delete "tpermo" and insert -- tperrno --, therefor.

In column 12, line 1, delete "tpermo" and insert -- tperrno --, therefor.

In column 12, line 7, delete "tpermo" and insert -- tperrno --, therefor.

In column 12, line 9, delete "tmpresend" and insert -- _tmpresend --, therefor.

Signed and Sealed this
Thirty-first Day of January, 2012

David J. Kappos
*Director of the United States Patent and Trademark Office*